United States Patent [19]

Clark et al.

[11] Patent Number: 4,481,532
[45] Date of Patent: Nov. 6, 1984

[54] METHOD OF DETERMINING AND STORING COLOR PRINTING INFORMATION

[75] Inventors: David A. Clark, Streamwood; Barbara J. Boyer, Chicago, both of Ill.

[73] Assignee: R. R. Donnelley & Sons Company, Chicago, Ill.

[21] Appl. No.: 396,247

[22] Filed: Jul. 8, 1982

Related U.S. Application Data

[63] Continuation-in-part of Ser. No. 393,054, Jun. 28, 1982, abandoned.

[51] Int. Cl.$^3$ .............................................. H04N 1/46
[52] U.S. Cl. ...................................................... 358/80
[58] Field of Search ........................................ 358/80

[56] References Cited

U.S. PATENT DOCUMENTS 2,434,561  1/1948  Hardy et al.
3,612,753 10/1971  Korman
4,058,828 11/1977  Ladd
4,060,829 11/1977  Sakamoto

FOREIGN PATENT DOCUMENTS 1369702 10/1974 United Kingdom

OTHER PUBLICATIONS

Paper to Technical Association of Graphic Arts entitled "A Proposed Engineering Approach to Color Reproduction" by Irving Pobbaravsky, Jul., 1977.

Primary Examiner—Richard Murray
Attorney, Agent, or Firm—Wood, Dalton, Phillips, Mason & Rowe

[57] ABSTRACT

A method of determining a set of color correction values includes generating a set of three gray mapper, or gamma, curves and determining from these curves the amount of color correction required to duplicate a sample set of color chips utilizing the particular inks and paper to be used in the final printing process. A set of correction percentages is generated from the correction determination for each of the colors of the set of color chips and these percentages are used in conjunction with input color values to generate corrected color values. The corrected color values may be modified to permit the variable substitution of black ink for a combination of the three colored inks or may be used to compensate for variations in hue of different black inks.

22 Claims, 16 Drawing Figures

52 — DETERMINE VALUES FOR CORRECTION BY LOCATING COMPONENT ENGRAVING VALUES $Y_E, M_E, C_E$ ON Y-AXIS FOR EACH COLOR CHIP USING GAMMA CURVES TO NOTE CORRESPONDING X-AXIS VALUE TO OBTAIN $Y_C, M_C, C_C$

54 — DETERMINE FOR EACH CHIP: HI, MID, LOW OF $Y_S, M_S, C_S$ AND VAL (COL) WHERE
VAL (COL) = HI-MID FOR A PRIMARY COLOR CHIP;
VAL (COL) = MID-LOW FOR A SECONDARY COLOR CHIP; OR
VAL (COL) = 2 × [LOWER OF (HI-MID) AND (MID-LOW)] FOR A TERTIARY COLOR CHIP

56 — DETERMINE AMOUNT OF CHANGE REQUIRED FOR EACH COLOR CHIP
$\Delta Y = Y_C - Y_S$, $\Delta M = M_C - M_S$, $\Delta C = C_C - C_S$

58 — DETERMINE PERCENTAGE CHANGE:

$$\% \Delta Y = \frac{\Delta Y}{VAL(COL)} \times 100$$

$$\% \Delta M = \frac{\Delta M}{VAL(COL)} \times 100$$

$$\% \Delta C = \frac{\Delta C}{VAL(COL)} \times 100$$

METHOD OF DETERMINING AND STORING COLOR PRINTING INFORMATION

CROSS REFERENCE TO RELATED APPLICATION

This application is a continuation-in-part of Clark et al. Application Ser. No. 393,054, filed June 28, 1982, entitled "Method of Developing and Storing Color Printing Information", now abandoned.

DESCRIPTION

BACKGROUND OF THE INVENTION

This invention relates generally to color reproduction techniques, and in particular to a method for determining and storing color printing information in the memory of a system for color reproduction.

One such color reproduction system is shown and described in Clark et al Ser. No. 292,293 filed Aug. 12, 1981, now abandoned entitled "Method of Color Conversion with Improved Interpolation" and assigned to the assignee of the instant application. This system utilizes a memory in which is stored a set of corrected color component values for reproducing a fraction of the total number of possible input colors. Corrected values for the remainder of the input colors are generated by an interpolative process based upon the contents of the memory. The developed corrected values represent, for example, engraving information in a rotogravure printing system and represent ink values for each of the printing primary colors yellow, magenta and cyan, or Y,M,C, as well as black, or K, to allow reproduction of an input color.

In order to reproduce accurately an input picture element, or pixel, it is necessary to load the memory with values which account for the characteristics of the particular inks and paper to be used in the final printing process. One prior process for generating a set of corrected values and for using these values to perform color reproduction is shown in Korman U.S. Pat. No. 3,612,753. A large number of patches, e.g. 512, of arbitrary colors are printed using the particular inks and paper to be used in the final printing process. The color component engraving values required to print each patch are noted. The patches are scanned by a densitometer to develop scanned values. The engraving values and scanned values are combined in a memory such that the engraving values are addressed by the scanned values. The input matter to be reproduced is scanned and the resulting values are used to address the memory. The values from the memory are used in conjunction with interpolated values to engrave printing plates to allow reproduction of the input matter.

Another type of process for developing corrected values and for using the values to engrave printing plates is described in Hardy et al U.S. Pat. No. 2,434,561. A color chart of nine colors is printed using the inks and paper to be used in the final printing process. The colors are formed from the printing primary color components, i.e. cyan, yellow and magenta, and from combinations of these colors. The engraving values required to produce these colors are noted. The color chart is then scanned by a densitometer to obtain scanned values for each of the nine color patches. The engraving and scanned values are inserted into a set of transformation equations, i.e. Neugebauer's equations, and the equations are solved for the constants.

Input matter to be duplicated is then scanned to obtain scanned values for each pixel of the input matter. Using the scanned values of the pixels and the constants obtained by solution of the transformation equations, the transformation equations are solved a second time to calculate the engraving signals which are required to reproduce the input pixel colors. A set of color plates is then engraved using the engraving signals.

Such processes for generating corrected color values are cumbersome and/or exceedingly complex. The first requires the printing and scanning of a large number of color patches while the second requires a set of complex transformation equations to be solved twice to generate the corrected color values.

SUMMARY OF THE INVENTION

In accordance with the present invention, a method of determining a set of color correction values includes generating a set of three gray mapper, or gamma, curves and utilizing the curves in determining the amount of correction required to duplicate a sample set of at least six color chips using the particular inks and paper to be used in the final printing process. A set of correction percentages is generated from the correction determination for each of the six colors and these percentages are used in conjunction with a set of YMC input values to generate corrected YMCK color values.

The corrected color values each include a black color component K which may be used to permit the selective removal of each of the three primary color components Y,M,C and the substitution of black ink therefor. This gray replacement process may not only be used to perform what has been heretofore called undercolor removal, but also may be utilized to permit the substitution of black ink in only a portion of the input color space or may be used to compensate for variations in hue of different black inks.

The corrected color values generated by this process account for the characteristics of the particular inks and paper to be used in the final printing process and permit the accurate reproduction of input matter. The process generates the corrected color values from a small set of sample colors and does not depend upon the solution of a set of complex transformation equations, thereby avoiding the disadvantages noted above.

In addition, the method of the present invention may be used to compensate for the relative strength or weakness of black ink as compared with the strength of the gray component in the color generated by the remaining three color components. For example, one may compensate for a weak black ink by substituting larger amounts thereof than what would be theoretically necessary for a given removal of the remaining three color components.

DESCRIPTION OF THE PREFERRED EMBODIMENT

Figure 1:
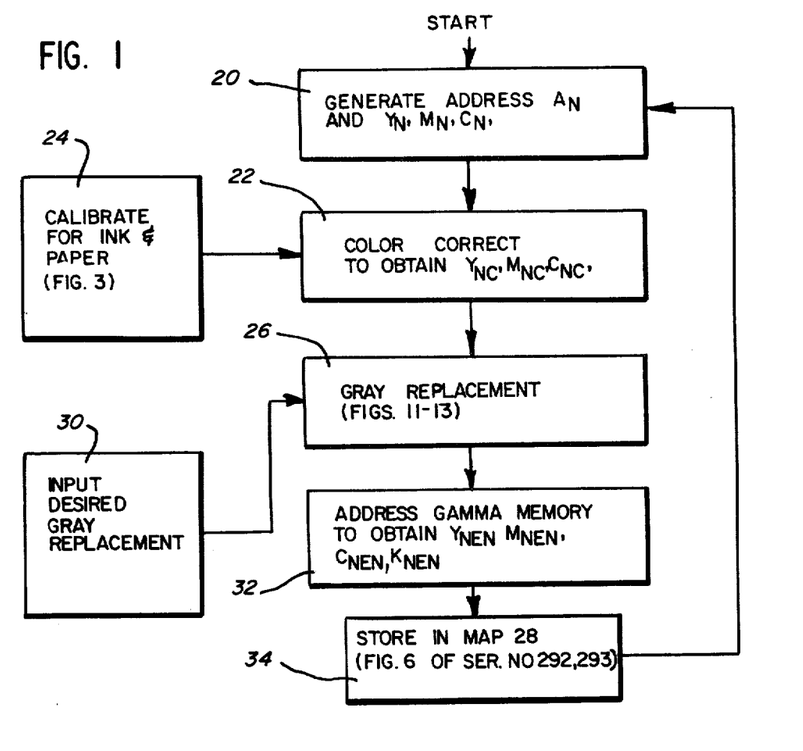
FIG. 1 is a simplified block diagram of a process for determining and storing color printing information according to the present invention.

Referring now to FIG. 1, there is illustrated a method of determining and storing color printing information in the memory of a system for color reproduction. The system for color reproduction may be that shown in Clark et al Ser. No. 292,293, now abandoned, referred to above, the disclosure of which is hereby incorporated by reference. For the purpose of assisting in an understanding of the present invention, a brief description of this color reproduction system will be made, it being understood that a more detailed description is contained in the above-noted patent application.

In operation of the color reproduction system, the color of an input picture element, or pixel, is analyzed to develop a set of three input color component values. These color components may in terms of the printing primary colors yellow, magenta and cyan (or YMC) or may be in terms of the light primary colors red, green and blue (or RGB). The color component values are used to address a memory map which, for example, may have $16^3$ or 4096 addresses identified in three dimensions by the input color components. At each memory map address there is stored yellow, magenta, cyan and black, or YMCK, corrected values which represent, for example, engraving information in a rotogravure printing system. The corrected values are dependent upon the printing characteristics of the ink and paper to be used in the final printing process.

In order to derive corrected color values for those input colors having component values between addresses in the memory, an interpolative process is used.

The method of the present invention determines the corrected color values and loads these values into the memory map 28 of FIG. 6 of Clark et al Ser. No. 292,293. Although the method of the present invention is shown and described in connection with the generation of printing information for a rotogravure printing process, it should be noted that the values determined by the method of the present invention and stored in the memory map may represent other types of information for use in alternative printing processes, such as halftone or another type of process.

Referring now to FIG. 1, there is illustrated a simplified block diagram of the method of the present invention. At a block 20, an address $A_n$ consisting of a set of three component words $A_{n1}$, $A_{n2}$, $A_{n3}$ is generated. The block 1 also derives from the address $A_n$ a set of three color component words $Y_n$, $M_n$ and $C_n$ representing a color in an input color space. The input color space may be visualized as a three dimensional cartesian coordinate system such as that shown in FIG. 2. In this color space, the axes represent the three printing primary colors, i.e. yellow, magenta and cyan, with the origin of the color space representing the point at which no colors are printed and therefore the resultant is a white "color". When maximum amounts of the three primary colors are combined, a black "color" results and when less than the saturated value of each of the three colors are combined in equal amounts, a gray "color" results. The possible values of gray lie on a straight line connecting the white and black points.

Figure 2:
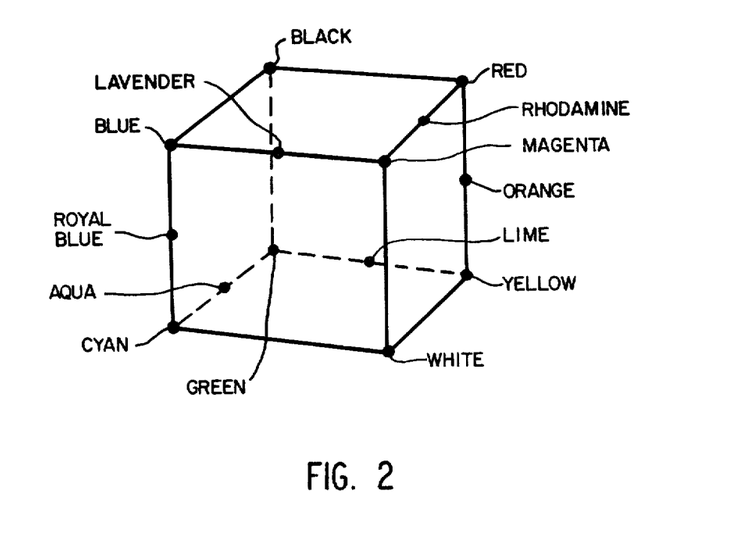
FIG. 2 is a representation of a color space expressed in cartesian coordinate form.

Equal amounts of two primary colors while the third color is equal to zero result in a secondary color red, green or blue. All values of each secondary color lie on a diagonal across one of the faces of the cube bounded by two of the axes of the coordinate system. Tertiary colors are found at the midpoint between primary and secondary colors, such as orange which lies midway between yellow and red, and rhodamine which lies midway between red and magenta.

The color represented by the color component words $Y_n$, $M_n$, $C_n$ is then corrected in a block 22, FIG. 1, to obtain color corrected values denoted $Y_{nc}$, $M_{nc}$, $C_{nc}$. The characteristics of the inks and paper to be used in the printing process are analyzed, block 24, and used to calibrate the color correction of block 22.

The values $Y_{nc}$, $M_{nc}$, $C_{nc}$ are then modified in a block 26 by the selective removal of portions of each of the three color components and the generation of a fourth color component value K for black ink to effect a process hereinafter denoted "gray replacement". The gray replacement process is controlled by operator inputs shown at a block 30. The gray replacement process not only performs conventional undercolor removal, but also may be used to vary the proportion of one ink with respect to the remaining three inks to account for variations in hue of different black inks as noted more specifically below.

The values from the gray replacement process are then modified by a block 32 to account for the engraver characteristics. This is accomplished by using the values from the block 32 to address a memory in which is stored a set of three gamma curves derived during the calibration process, block 24, as discussed more fully below. The resulting values, denoted $Y_{nen}$, $M_{nen}$, $C_{nen}$, and a black value $K_{nen}$, are then stored in the map 28 shown in FIG. 6 of Ser. No. 292,293 by a block 34. Control is then returned back to the block 20 to generate the next address in the memory.

Figure 3A:
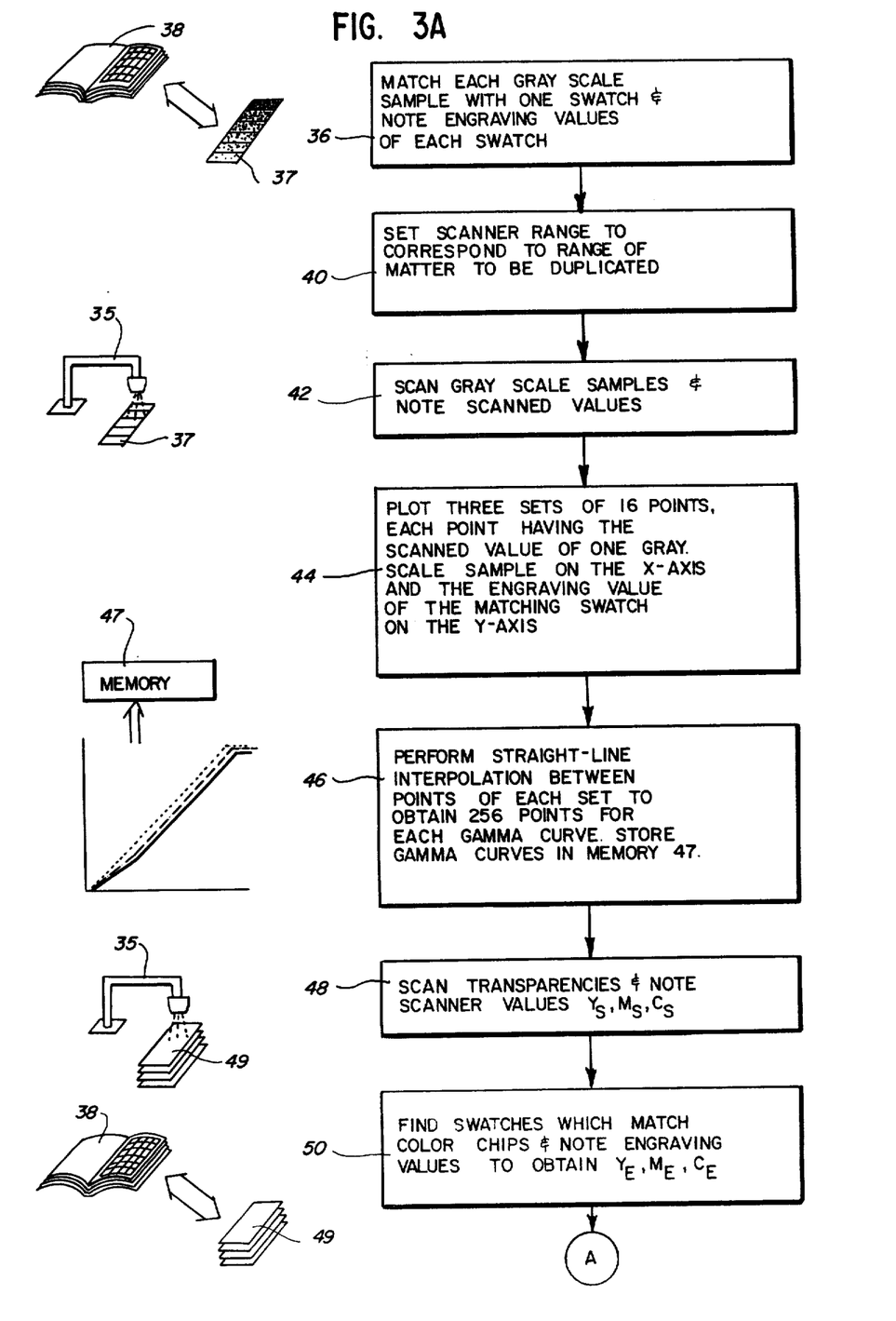
FIGS. 3A, 3B and 3C, when joined along similarly lettered lines, form a detailed block diagram of the calibration process shown as block 24 in FIG. 1.
Figure 3B:
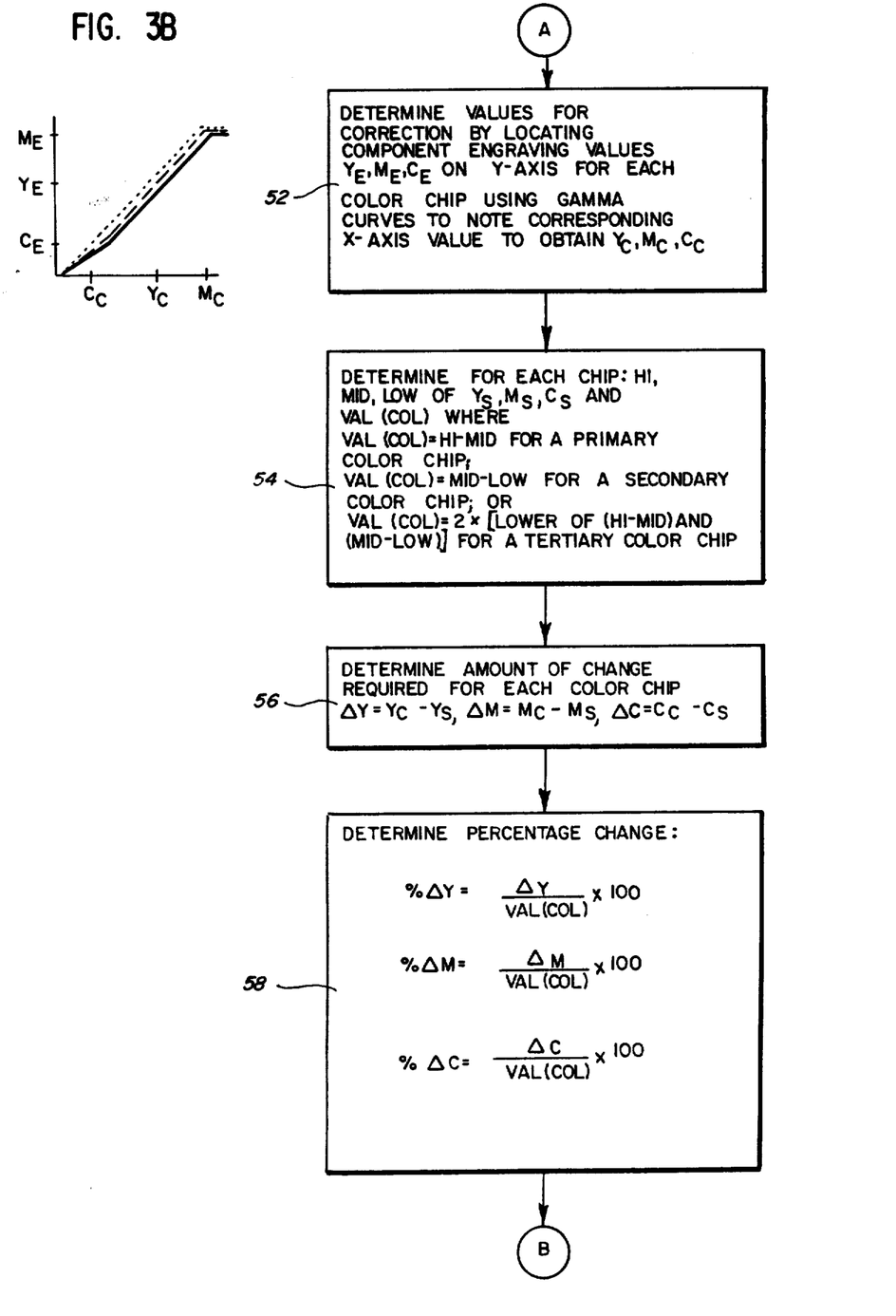
Figure 3C:
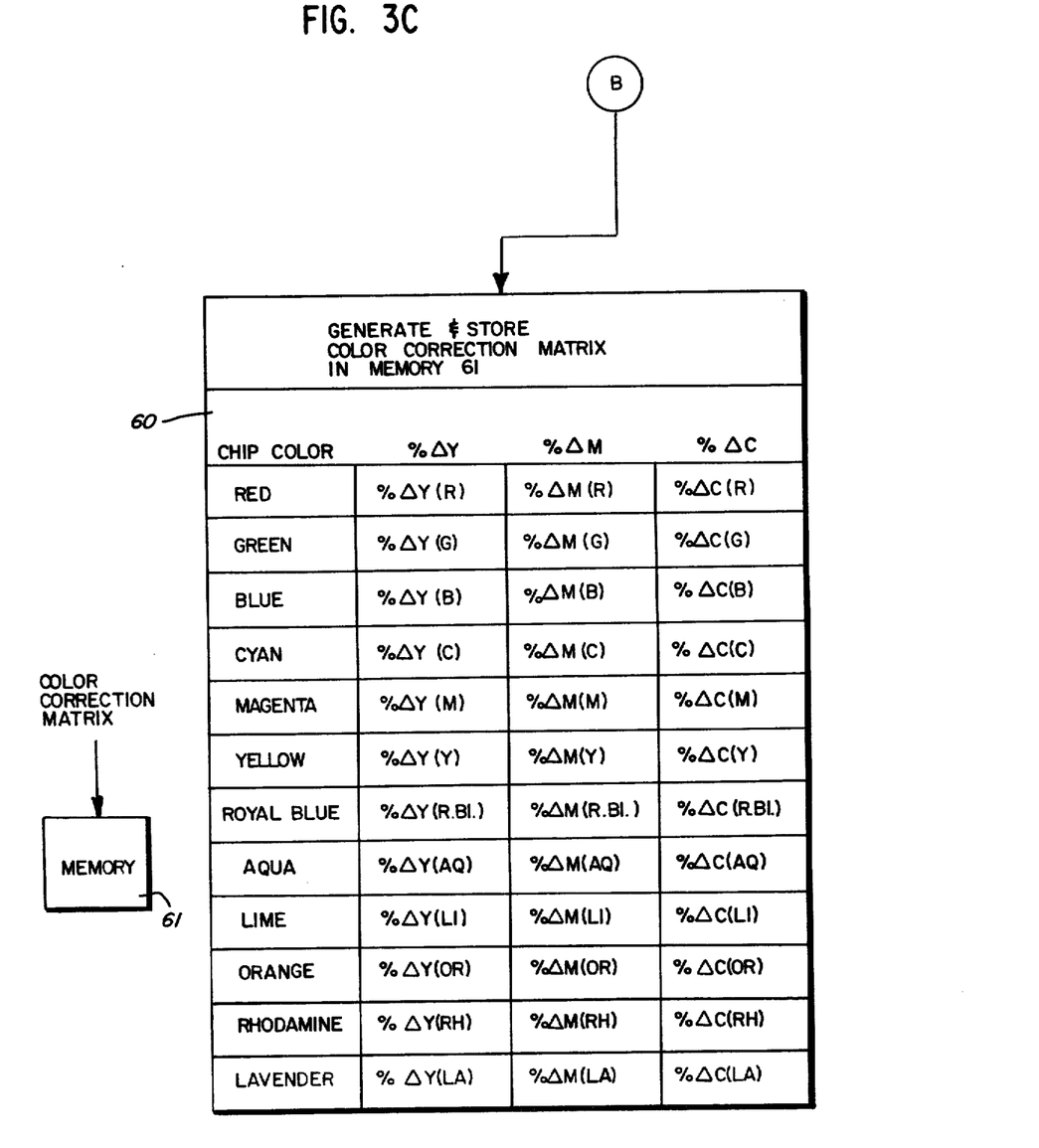

Referring now to FIG. 3, there is shown the process of block 24 of FIG. 1 of calibration for the characteristics of the particular inks and paper to be used in the final printing process. The steps of FIG. 3 are implemented in part by manual operations and in part under control of a processor.

A color separation scanner 35 (shown in schematic adjacent the blocks of FIG. 3) is adjusted by performing a series of steps represented by blocks 36 and 40. First, each sample of a standard gray scale 37, such as a No. 96 Kodak fine grain gray scale, is compared with color swatches in a swatchbook printed with the ink and paper which are to be used in the printing process. As shown in greater detail in FIG. 4, in the preferred embodiment the swatchbook consists of 16 pages, each page containing 16×16 or 256 color swatches. The book therefore has 16×256 or 4096 swatches. The chips are arranged on each page with varying values of two of the primary colors while the third color is held constant. For example, as a page is traversed upwardly, increasing values of magenta may be encountered, while increasing values of cyan may be encountered as one moves to the left of the page. The pages in the swatchbook 38 are arranged in order of increasing values of the third color, in this case yellow. The book has engraving values for each of the color chips contained therein, such values appearing in the righthand and lower margins of each page.

Figure 4:
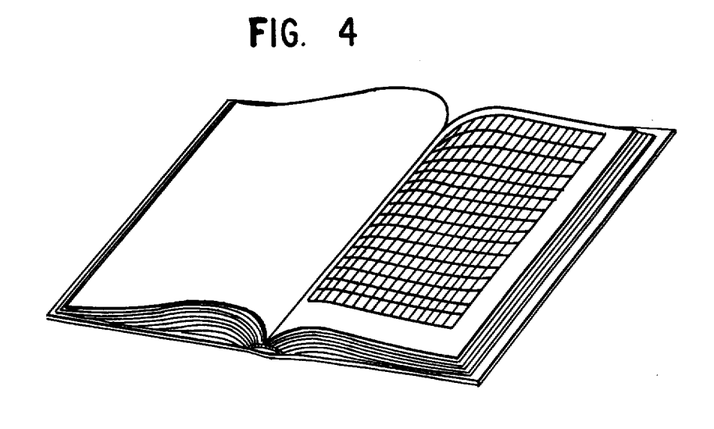
FIG. 4 is a perspective view of a swatchbook used in the present invention.

It should be noted that in the preferred embodiment the 4096 swatchbook colors do not correspond to the colors represented by the 4096 addresses of the memory, although in alternative embodiments there may be such a correspondence. Moreover, it is not critical that the swatches be arranged in the swatchbook in the above described sequence, this arrangement being used merely for purposes of convenience.

The engraving values of the swatches in the swatchbook 38 which match each sample of the gray scale 37 are noted. Samples of the gray scale 37 are then scanned by the color separation scanner 35, and the highlight and balance of the scanner are adjusted so that the range of output values from the scanner corresponds with the range of input matter to be duplicated in the final printing process.

Figure 5:
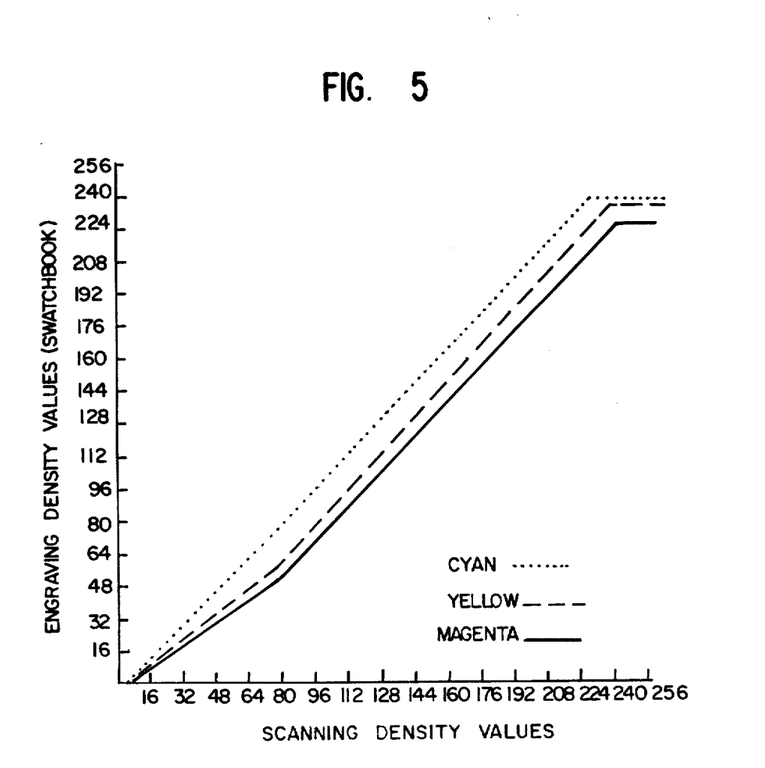
FIG. 5 is a graph of a set of three gray mapper or gamma curves used in the calibration process shown in FIG. 3.

Following adjustment of the scanner, a set of three gray mapping, or gamma curves, shown in FIG. 5, are generated which are used to determine a set of correction percentages. These percentages are utilized by the block 22 of FIG. 1 to effect the color correction.

As shown by the block 42 of FIG. 3, each of the samples of the gray scale are scanned by the color separation scanner 35 and the scanned values $Y_s$, $M_s$, $C_s$ developed thereby are noted. Three sets of at least 16 points are then plotted on a graph having scanning density values on its X axis and engraving density values from the swatchbook on its Y axis. The points are defined as the intersections of the second scanned value of one sample from the gray scale with the three engraving values of the nearest gray step in the swatchbook 38 to the sample of the gray scale 37.

A straight line interpolation is then performed, block 46, between the points of each set to form a total of 256 points in each set. The three sets of points thereby define three curves which are shown more specifically in FIG. 5. The points of the three curves are stored in a gamma curve memory 47 for use in determining the correction percentages.

Following the generation of the gamma curves, a set of color chips is scanned, block 48, and the scanner values $Y_s$, $M_s$, $C_s$ are noted. In the preferred embodiment, the set of color chips consist of six transparencies made on standard dupe film. It should be noted that six colors is the minimum required and should be selected to produce mathematically pure colors when scanned and should fall within the printable color space. These colors are the primary and secondary colors yellow, magenta, cyan, red, green, and blue.

It should be noted that more than six color chips may be used to calibrate for the characteristics of the inks and paper to be used. For example, six additional color chips for the tertiary colors may be used. For ease of notation, the tertiary colors have been abbreviated as follows:

Royal blue—R.Bl.
Aquamarine—Aq
Lime—Li
Orange—Or
Rhodamine—Rh
Lavender—La

The process of FIG. 3 will be described with the assumption that the six tertiary chips are used for calibration in addition to the six color chips previously described.

Each of the color chips 49 is then visually compared with the swatches in the swatchbook 38 and the engraving values of the swatches which match the color chips are noted to obtain a set of engraver values for each chip, denoted $Y_e$, $M_e$, $C_e$. A set of values for correction, designated $Y_c$, $M_c$, $C_c$, is then determined by locating the component engraving values $Y_e$, $M_e$, $C_e$ on the Y axis of the gamma curve for each color chip and noting the corresponding scanned value on the X axis. This may performed by accessing the memory in which the gamma curves are stored.

For each chip, the amount of color therein, designated VAL(COL), is determined depending upon whether the chip is a primary, secondary or, if utilized, a tertiary color.

If a printing primary color chip:

$$VAL(COL) = HI - MID$$

If a printing secondary color chip:

$$VAL(COL) = MID - LOW$$

If a tertiary color chip:

$$VAL(COL) = 2 \times \text{(lower value of (HI-MID) and (MID-LOW))}$$

Where HI, MID, LOW are the highest, middle and lowest values of the color components $Y_s$, $M_s$, $C_s$, of each chip.

Following this step the amount of color correction required to accurately reproduce the color of each chip is determined in a block 56 by calculating a set of three values $\Delta Y$, $\Delta M$, and $\Delta C$ as follows:

$$\Delta Y = Y_c - Y_s$$

$$\Delta M = M_c - M_s$$

$$\Delta C = C_c - C_s$$

The percentage change in each of the three component colors for each chip is then calculated in a block 58 by dividing the amount of color change determined in the block 56 by the amount of the color present in the chip and multiplying by 100% as follows:

$$\%\Delta Y = \frac{\Delta Y}{VAL\ (COL)} \times 100\%$$

$$\%\Delta M = \frac{\Delta M}{VAL\ (COL)} \times 100\%$$

$$\%\Delta C = \frac{\Delta C}{VAL\ (COL)} \times 100\%$$

Following the block 58, a block 60 generates and stores in a memory 61 a color correction matrix which contains the percentage change in each of the three component colors required to accurately reproduce the six (or twelve if the six tertiary color chips are used) color chips using the set of inks and paper to be used in the final printing process. The values shown in the matrix of block 60 are denoted as a percentage change in each of the three color components for each chip, e.g. for the red chip the percentage change of yellow is denoted %ΔY(R) while the percentage change in magenta and cyan for this chip are denoted %ΔM(R), %ΔC(R), respectively.

It should be noted that if the color chips used to derive the correction percentages stored by the block 60 have some degree of contamination, i.e. are not mathematically pure colors, then the calibration process of FIG. 3 must be iterated one or more times to obtain sufficiently accurate correction percentages. This problem may be obviated by utilizing color chips which have a low degree of contamination.

Figure 6A:
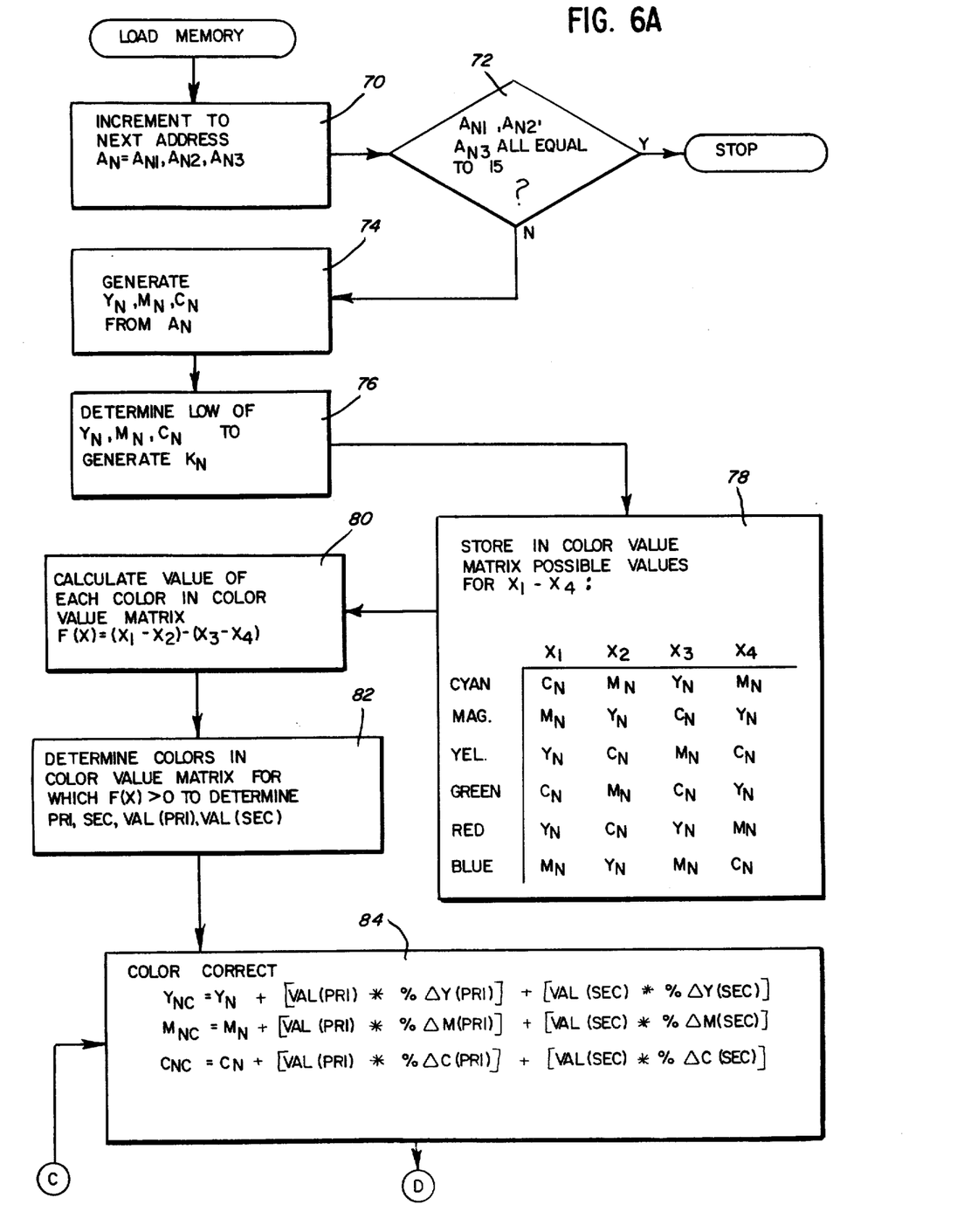
FIGS. 6A and 6B, when joined along similarly lettered lines, comprise a single flowchart of the process shown in FIG. 1.
Figure 6B:
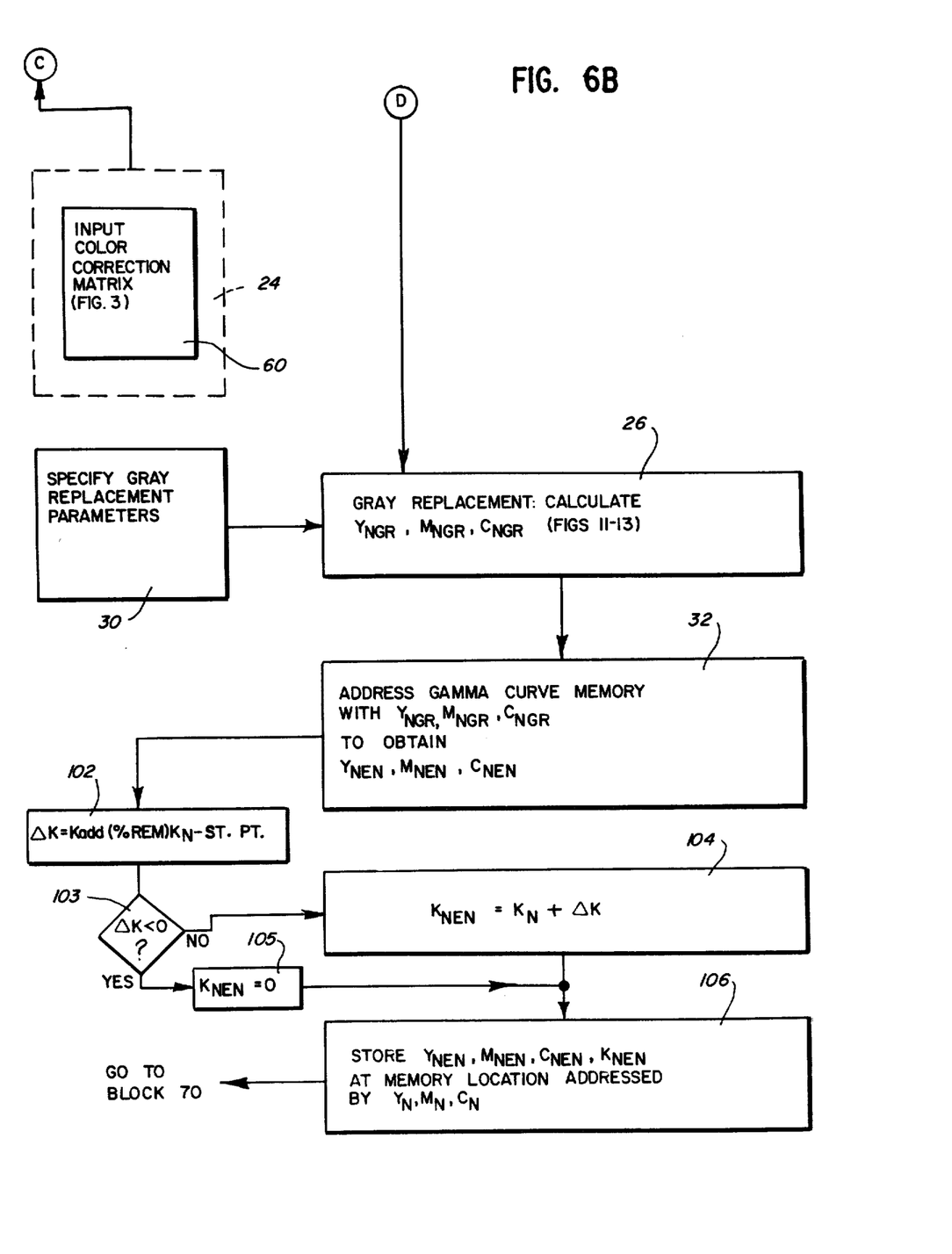

Referring now to FIG. 6, there is illustrated in greater detail the process generally shown in FIG. 1. The process shown in FIG. 6 may be implemented by suitably programming a general purpose computer and by using the apparatus shown in FIG. 6 of Clark et al Ser. No. 292,293 referred to above to load the memory map 28 shown therein.

Figure 9:
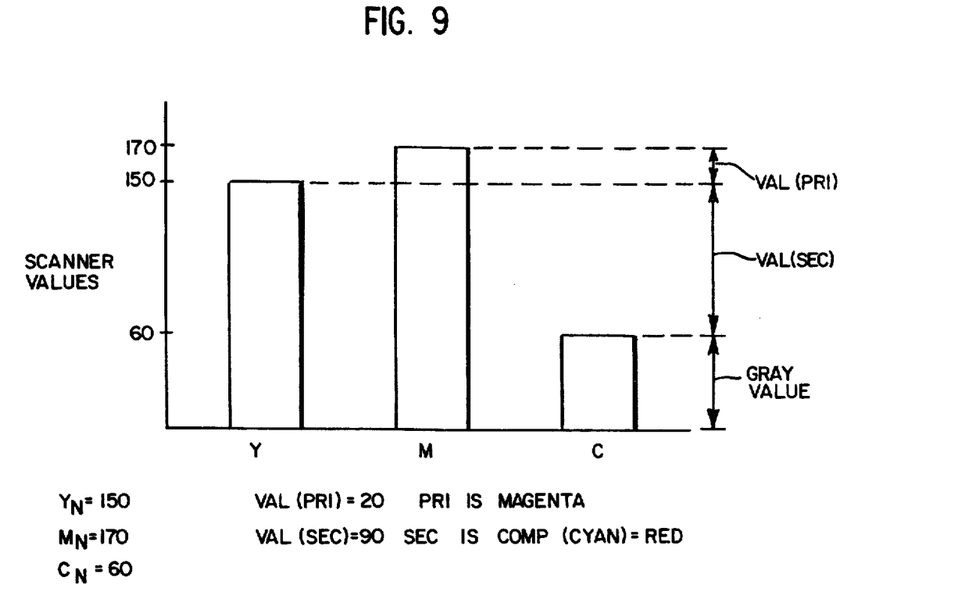
FIGS. 9 and 10 are bar graphs illustrating two examples of input colors corrected in accordance with the process of the present invention.

Referring also to FIG. 9, the process for loading of the memory shown in FIG. 6 will be explained in conjunction with an example wherein the values of $Y_n$, $M_n$, and $C_n$ are equal to 150, 170, 60 respectively. It will also be assumed that the color correction shown generally in block 22 of FIG. 1 will be performed using correction percentages derived from only the primary and secondary color chips. A description of the process of FIG. 6 utilizing correction percentages derived from the tertiary color chips follows in a later portion of this specification.

The process shown in FIG. 6 begins at a block 70 which determines the current address of the memory map and increments to the next address $A_n$. As previously noted, the memory contains 4096 memory positions, each of which are identified by three four-bit words denoted $A_{n1}$, $A_{n2}$, $A_{n3}$ of the address $A_n$. The address positions may be thought of as forming a three dimensional space with each address word representing the position of the address along one of three axes. The memory positions are accessed along these axes from the first memory position, identified as 0,0,0, up to and including the last memory position identified as 15,15,15.

A block 72 then determines whether the last memory position has been accessed, i.e. whether all of $A_{n1}$, $A_{n2}$, $A_{n3}$ are equal to 15. If this is true, all of the corrected values have been loaded in the map and the process is stopped. If this is not true, control passes to a block 74.

The block 74 generates values in the input color space, denoted $Y_n$, $M_n$, $C_n$ from the address $A_n$. Each color component word, (e.g. $Y_n$) is a eight-bit number with the four most significant bits thereof equal to the corresponding four-bit word of the address, i.e. $A_{n1}$, and with the four least significant bits thereof equal to zero.

A block 76 determines the least value of the color component words $Y_n, M_n, C_n$ to generate a value, designated $K_n$, of a black color component or channel. In the example shown in FIG. 9 the lowest value of $Y_n$, $M_n$, $C_n$ is the cyan channel which has a value of 60 units. This value is subsequently used in a gray replacement process described below.

A series of blocks 78-82 then identify the primary and secondary color components of the input color and determine the values of the primary and secondary colors. The block 78 stores in a color value matrix possible values for a set of variables $X_1$ through $X_4$ for each of the primary and secondary printing colors. For the example shown in FIG. 9, the following will be the values stored in the color value matrix:

|       | $X_1$ | $X_2$ | $X_3$ | $X_4$ |
|-------|-----|-----|-----|-----|
| cyan  | 60  | 170 | 150 | 170 |
| mag   | 170 | 150 | 60  | 150 |
| yel   | 150 | 60  | 170 | 60  |
| green | 60  | 170 | 60  | 150 |
| red   | 150 | 60  | 150 | 170 |
| blue  | 170 | 150 | 170 | 60  |

An equation is then solved by block 80 using the values in the color value matrix as follows:

$$F(x) = (X_1 - X_2) - (X_3 - X_4).$$

The equation for $F(x)$ is solved for each of the primary and secondary colors. It should be noted that none of the terms $F(x)$, $(X_1 - X_2)$ or $(X_3 - X_4)$ is allowed to be negative. If the result of the computation for these terms is a negative number, then a value of zero is substituted for the term.

In the example shown in FIG. 9. the following chart represents the results of the calculation for $F(x)$:

| color | $F(x)$ |
|-------|------|
| cyan  | 0    |
| mag   | 20   |
| yel   | 0    |
| green | 0    |
| red   | 90   |
| blue  | 0    |

It can be seen that the values of $F(x)$ for cyan, yellow, green and blue is zero while the value for magenta is 20 and the value for red is 90. From the calculation in block 80, a block 82 then defines a pair of variables PRI and SEC which represent the colors in the color value matrix for which $F(x)$ is greater than zero. In the present example, the primary color for which $F(x)$ is greater than zero is magenta while the secondary color for which $F(x)$ is greater than zero is red. The block 82 also assigns values to two variables, denoted VAL(PRI) and VAL(SEC) as follows:

VAL(PRI) = value of F(x) of PRI

VAL(SEC) = value of F(x) of SEC

In the present example, VAL(PRI) is equal to 20 and VAL(SEC) is equal to 90.

As shown in FIG. 9, PRI is the color having the highest valued component, while VAL(PRI) is equal to the amount that the highest valued color, i.e. magenta, exceeds the middle color, which in this case is yellow. The value of the secondary color is the amount by which the middle color exceeds the lowest color, i.e. cyan. The determination of SEC is obtained by determining the complement of the lowest valued color. In this case, the secondary color, red, is the complement of cyan.

Following the block 82, a block 84 calculates color corrected values for each of the color components of the colors represented by the addresses of the memory in accordance with the determination of the colors PRI, SEC and the values VAL(PRI), VAL(SEC). The block 84 receives as an input the matrix of correction percentages from the block 60 of FIG. 3.

Assume in the instant example that the following color correction matrix was determined in the process of FIG. 3 (the tertiary color chips are not used in this example and hence the correction percentages therefor are not shown):

| chip color | % ΔY | % ΔM | % ΔC |
|---|---|---|---|
| red | 25% | 79% | −25% |
| green | 140% | 4% | 8% |
| blue | −50% | 2% | 50% |
| cyan | −57% | −87% | −29% |
| mag | −100% | 12% | −65% |
| yel | 29% | −14% | −14% |

Since, in the above example, it was determined that PRI is magenta and SEC is red and that VAL(PRI) equals 20 and VAL(SEC) equals 90, the following equations are obtained from the equation shown in block 84.

$$Y_{NC} = Y_N + [20 (\% \Delta Y(M))] + [90 (\% \Delta Y(R))]$$
$$= 150 + [20(-100\%)] + [90(25\%)]$$
$$= 150 - 20 + 22 = 152$$
$$M_{NC} = M_N + [20 (\% \Delta M(M))] + [90 (\% \Delta M(R))]$$
$$= 170 + [20(12\%)] + [90(79\%)]$$
$$= 170 + 2 + 71 = 243$$
$$C_{NC} = C_N + [20 (\% \Delta C(M))] + [90 (\% \Delta C(R))]$$
$$= 60 + [20(-65\%)] + [90(-25\%)]$$
$$= 60 - 13 - 22 = 25$$

Following the block 84, the block 26 performs a gray replacement process in accordance with operator inputs from the block 30 representing the gray replacement parameters for the process, as described hereinabove in connection with FIG. 1.

Figures 11, 12, 13:
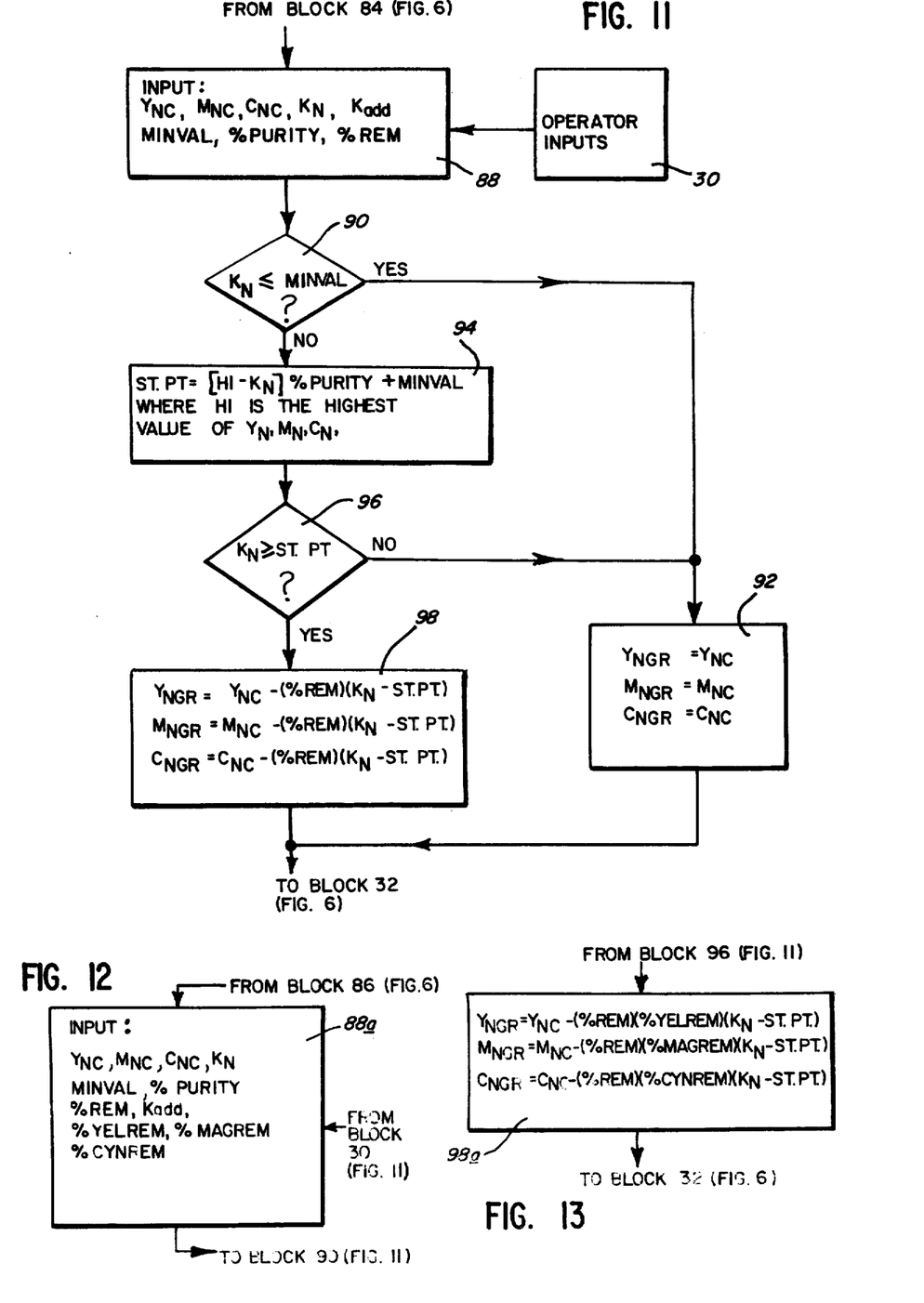
FIG. 11 is a flowchart of the gray replacement process shown in FIGS. 1 and 6.
FIGS. 12 and 13 are block diagrams which may be substituted for the blocks 88 and 98 of FIG. 11 to derive an alternative gray replacement process.

Referring also to FIG. 11, there is illustrated the gray replacement process performed by the block 26 of FIG. 6. The process receives as inputs the values $Y_{nc}$, $M_{nc}$, $C_{nc}$ and $K_n$ as determined by the blocks 76 and 84 of FIG. 6. Also used as inputs to the gray replacement process are operator determined values defined as follows:

MINVAL = point in color space below which no undercolor removal is performed.

%PURITY = extent to which undercolor removal is allowed to operate in the color space. A purity percentage equal to zero allows the removal of all colors containing a gray value greater than a variable ST.PT. described below.

%REM = percent to be removed from each component $Y_{nc}$, $M_{nc}$, $C_{nc}$ $K_{add}$ = percent of %REM to add to black channel (typically greater than 100%).

For purposes of illustration, assume that the operator determined inputs are assigned values as follows:
MINVAL = 10
%PURITY = 40%
%REM = 50%
$K_{add}$ = 120%

Following the assigning of values to the variables, a decision block 90 determines whether the value $K_n$ is less than or equal to the value MINVAL. If this is the case, then the input color is in that portion of the color space in which no undercolor removal is desired, and hence a block 92 simply assigns the values $Y_{nc}$, $M_{nc}$, $C_{nc}$ to a set of values $Y_{ngr}$, $M_{ngr}$, $C_{ngr}$, respectively. If however $K_n$ is not less than or equal to MINVAL, then a block 94 calculates a value of a variable ST.PT. This value in the instant example is calculated as follows:

$$ST.PT = [170 - 60]40\% + 10 = 110 \times 40\% + 10 = 54$$

A block 96 then determines whether the value of $K_n$, which in this case is equal to 60, is greater than or equal to the value ST.PT. In the present example, $K_n$ was determined to be 60 while ST.PT. is equal to 54 and hence the answer to the question posed in the block 96 is affirmative. Control then passes from the block 96 to a block 98 which calculates the values $Y_{ngr}$, $M_{ngr}$ and $C_{ngr}$ which are reduced with respect to the values $Y_{nc}$, $M_{nc}$, $C_{nc}$ to account for the substitution of black ink for the three color component inks. In the instant example, the results of the calculation by block 98 are as follows:

$$Y_{ngr} = 152 - ((50\%)(60-54)) = 149$$

$$M_{ngr} = 243 - ((50\%)(60-54)) = 240$$

$$C_{ngr} = 95 - ((50\%)(60-54)) = 92$$

Control from the block 98 then passes to the block 32, FIG. 6 to continue the process.

If it is determined by the block 96 that $K_n$ is not greater than or equal to ST.PT., the input color does not lie in that portion of the color space in which undercolor removal is desired. Therefore, control passes to the block 92 which simply assigns the values of $Y_{nc}$, $M_{nc}$, $C_{nc}$ to the values $Y_{ngr}$, $M_{ngr}$, $C_{ngr}$, respectively. Control from the block 92 then passes to the block 32, FIG. 6.

An optional addition to the gray replacement process shown in FIG. 11 is depicted in FIGS. 12 and 13. In general, this option utilizes three additional variables which allow an operator to variably remove differing amounts of each component color during the gray replacement process to account for differences in hue of different black inks. FIG. 12 shows a block 88a which may be substituted for the block 88 shown in FIG. 11. The block 88a, in addition to the inputs listed in block 88, allows the utilization of the three additional variables defined as follows:

%YELREM = percent of %REM to replace from yellow component

%MAGREM = percent of %REM to replace from magenta component

%CYNREM = percent of %REM to replace from cyan component

These additional variables are used by a block 98a, shown in FIG. 13, which is substituted for the block 98 shown in FIG. 11. For example, if a particular black to be used has a slight cyan color to it, then the variable %CYNREM would have a higher value than the variables %YELREM and %MAGREM to account for the excess cyan already present in the black ink.

Referring again to FIG. 6, following the block 98 or 98a, the block 32 accesses the memory 47 in which the gamma curves are stored with the values $Y_{ngr}$, $M_{ngr}$, $C_{ngr}$, to obtain engraver values denoted $Y_{nen}$, $M_{nen}$, $C_{nen}$. Following the block 32, a value $\Delta K$ is calculated by a block 102 which multiplies the values $K_{add}$, %REM and $K_n$ and subtracts from this result the value of the variable ST.PT. As previously noted, the values $K_{add}$ and %REM were entered by an operator in the gray replacement process shown by block 86.

A block 103 then inquires as to whether ΔK is less than zero to determine whether the three color components have been reduced during the gray replacement process. If ΔK is not less than zero, then gray replacement has been performed and a block 104 calculates the final value of the black channel, designated $K_{nen}$, by adding the value ΔK to the value $K_n$. If ΔK is less than zero, then the input color lies in that portion of the color space in which undercolor removal is not desired, and hence a block 105 sets the value $K_{nen}$ equal to zero. The final values for each of the color component channels are then stored by a block 106 at the memory location addressed by $Y_n$, $M_n$, $C_n$. Control from the block 106 then returns to the block 70 to continue the process.

Figure 7:
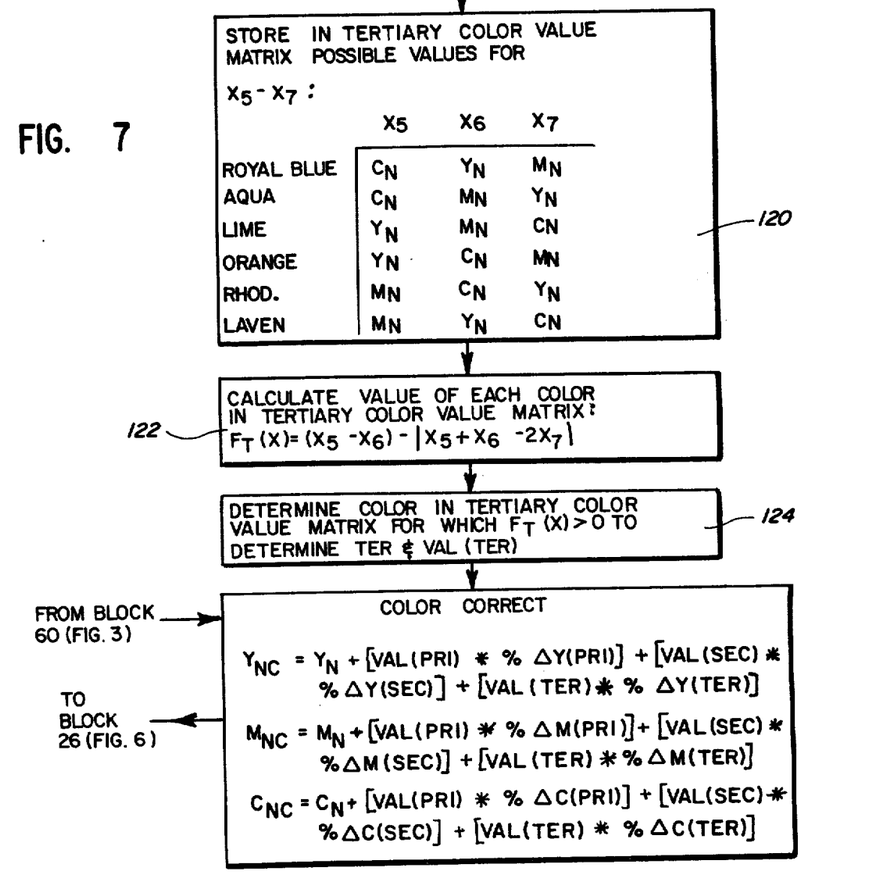
FIG. 7 is an alternative embodiment of the invention to be used in lieu of the block 84 shown in FIG. 6.

When using tertiary colors, an optional process may be used as shown in FIG. 7, which may be substituted for the block 84 of FIG. 6. The process shown in FIG. 7 performs color correction by taking into account not only the percent change of the three component colors in the primary and secondary components of the input color, but also color corrects in accordance with the percent change of the three component colors in the tertiary component of the input color. The process of FIG. 7 will be described in conjunction with an example of an input color represented in the bar graph of FIG. 10, wherein the input color has color component values $Y_n$, $M_n$, $C_n$ equal to 150, 120, 60 respectively.

Figure 10:
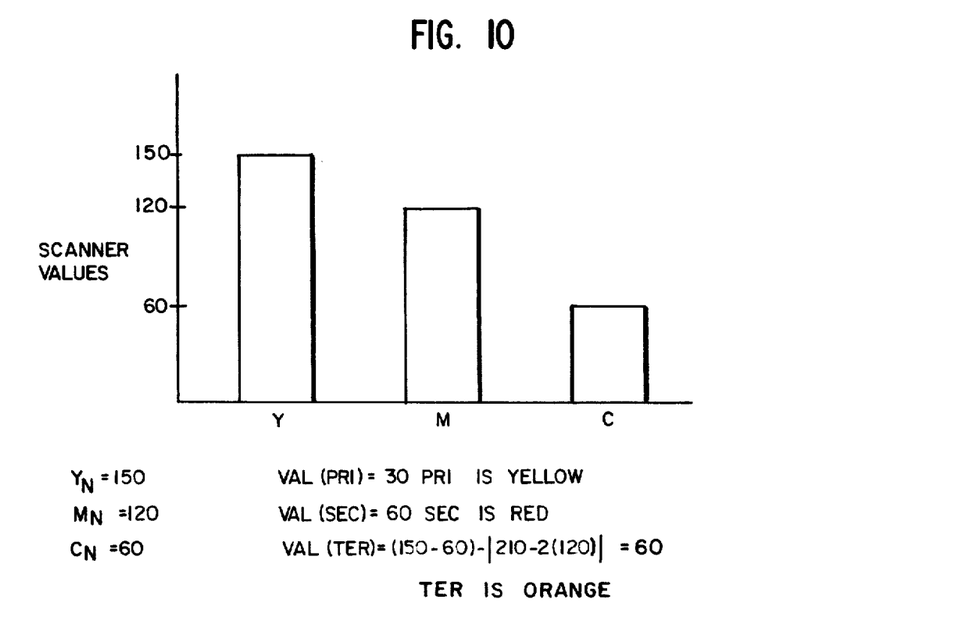

Following the block 82 of FIG. 6, a block 120 stores in a tertiary color value matrix possible values of three variables $X_5$ through $X_7$. Using the values of FIG. 10, the following tertiary value color matrix is obtained:

|       | $X_5$ | $X_6$ | $X_7$ |
|-------|-------|-------|-------|
| R.Bl. | 60    | 150   | 120   |
| AQ    | 60    | 120   | 150   |
| LI    | 150   | 120   | 60    |
| OR    | 150   | 60    | 120   |
| RH    | 120   | 60    | 150   |
| LA    | 120   | 150   | 60    |

Following the block 120, a block 122 calculates a value, denoted $F_t(x)$ of each color in the tertiary color value matrix. It should be noted that the quantity $(X_5 - X_6)$ as well as the value of each color $F_t(x)$ are constrained to be non-negative, i.e. if the result of the calculation for either of these terms is less than zero, then these terms are set equal to zero.

A block 124 then determines the color in the tertiary color value matrix for which $F_t(x)$ is greater than zero so as to identify the tertiary color component of the input color and to determine the value of that color. In the example shown in FIG. 10, solving the equation shown in block 122 yields the following results:

| Color | $F_t(x)$ |
|-------|----------|
| R.Bl. | 0        |
| AQ    | 0        |
| LI    | 0        |
| OR    | 60       |
| RH    | 0        |
| LA    | 0        |

Therefore, the tertiary color is orange and has a value of 60 units.

A block 126 then generates corrected values $Y_{nc}$, $M_{nc}$, $C_{nc}$ using the values stored in the color correction matrix by the block 60 of FIG. 3. The equation shown in the block 126 of FIG. 7 differs from the equation shown in block 84 of FIG. 6 by the addition of a third term for each of the three color components, which value is equal to the product of the value of the tertiary color and the percent change of the color component in the tertiary color.

Figure 8:
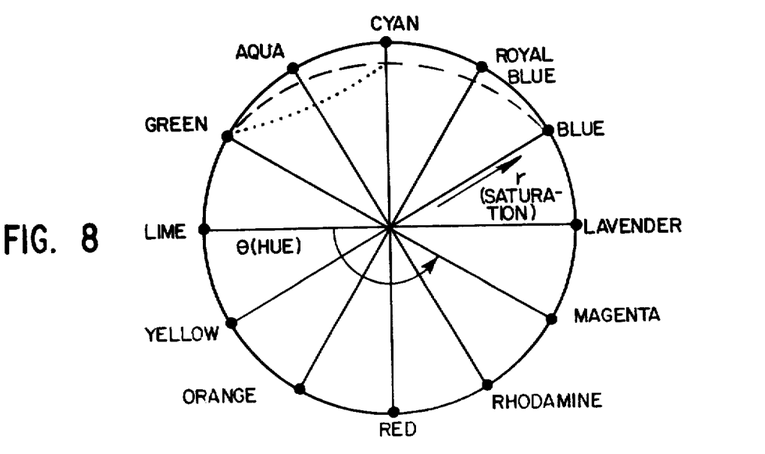
FIG. 8 is a color wheel representing a color space.

Referring now to FIG. 8, there is illustrated a second type of color space which is useful as an aid in understanding the effect the process of FIG. 6 has on the correction of input colors. The color space of FIG. 8 is expressed in polar coordinates (R, θ) where R represents the saturation of the color and θ represents the hue. The printing primary colors are equally spaced about the circle representing the color space, as are the printing secondary colors which are displaced 60° from the primary printing colors. The tertiary colors are also equally spaced about the color space between primary and secondary colors.

In general, the color correction process of FIG. 6 results in a distortion of the color space shown in FIG. 8. For example, it may be determined in the process of FIG. 3 that the particular inks and paper to be used in the printing process will result in an excess of cyan in the reproduced input matter. In this case, the color space representing the set of corrected values stored in the memory may be distorted by the color correction process to that shown by the dashed lines in the figure. The distortion occurs in only ⅓ of the circle, i.e. in that portion of the circle 60° on either side of the cyan line.

Similarly, a correction in one of the secondary colors, e.g. green, causes a distortion in the portion of the space 60° on either side of the green line.

However, a correction in one of the tertiary colors, e.g. aquamarine, results in a distortion of only 1/6 of the total color space, such as is shown by the dotted line of FIG. 8. Since the correction for a tertiary color would only occur in conjunction with the correction for a primary and/or secondary color, the correction shown for the tertiary color aquamarine is illustrated in conjunction with the example of the correction for the primary color cyan.

Since correction for any primary, secondary and tertiary color may be implemented, if follows that great flexibility is afforded by the process of the present invention to allow the generation of corrected color values permitting the accurate reproduction of input matter.

It should be noted that the method of the present invention is not limited to use with Y, M, C inputs and outputs. For example, RGB inputs and/or outputs may be used, or an entirely different type of color system may be employed, such as YIQ, HVS, or the like.

We claim:

1. A method of determining and storing color printing information in a memory of a color reproduction system from a set of values representing colors in an input color space, comprising the steps of:
    (a) scanning a plurality of samples of a gray scale with a color separation scanner to obtain a set of scanned values representing the density values of each color component for each sample;
    (b) determining the engraving values for each color component of each sample of the gray scale;
    (c) plotting a gamma curve for each color component of the gray scale samples, the gamma curves including points defined by the intersection of the scanned value of one color component with an engraving value of the same color component for each gray scale sample;

(d) determining from the gamma curves the amount of correction required to reproduce a set of colors utilizing a particular set of inks and paper to generate color correction values for each color of the set;

(e) utilizing the color correction values to modify the set of values representing colors in the input space to generate a set of second values representing colors in an output color space; and (f) storing the set of second values in the memory.

2. The method of claim 1, wherein the step (d) includes the steps of:

scanning each color of the set of colors to derive a first set of scanned values for each color component thereof;

ascertaining which color swatch of a plurality of color swatches matches each color of the set of colors to obtain a set of matching color swatches;

determining the engraving values of the color components of each matching color swatch;

determining a second set of scanned values for each matching color swatch by locating the engraving values for each matching color swatch on one axis of the gamma curves and noting the corresponding scanned values on the other axis of the gamma curves; and comparing the second set of scanned values with the first set of scanned values to obtain the color correction values.

3. The method of claim 2, wherein the step of comparing includes the step of subtracting the first set of scanned values from the second set of scanned values to determine the amount of change required to reproduce each color of the set of colors.

4. The method of claim 3, wherein the set of colors includes primary and secondary color chips, and wherein the step (d) further includes the steps of:

calculating the amount of color in each color chip depending upon whether the chip is a primary or a secondary color chip; and dividing the amount of change required to reproduce each color of the set of colors by the amount of color in each color chip to determine the percentage change of the color components required to reproduce each color of the set of colors.

5. The method of claim 3 wherein the set of colors includes primary, secondary and tertiary color chips, and wherein the step (d) further includes the steps of:

calculating the amount of color in each color chip depending upon whether the chip is a primary, secondary or tertiary color chip; and dividing the amount of change required to reproduce each color of the set of colors by the amount of color in each color chip to determine the percentage change of the color components required to reproduce each color of the set of colors.

6. The method of claim 4 or 5, wherein the step of calculating the amount of color includes the step of calculating for a primary color chip:

$$VAL(COL) = HI - MID$$

where VAL(COL) is the amount of color in the color chip, HI is the value of the highest valued color component from the first set of scanned values of the color chip and MID is the value of the middle valued color component from the first set of scanned values of the color chip.

7. The method of claims 4 or 5, wherein the step of calculating the amount of color includes the step of calculating for a secondary color chip:

$$VAL(COL) = MID - LOW$$

where VAL(COL) is the amount of color in the color chip, MID is the value of the middle valued color component from the first set of scanned values of the color chip and LOW is the value of the lowest valued color component from the first set of scanned values of the color chip.

8. The method of claim 5, wherein the step of calculating the amount of color includes the step of calculating for a tertiary color chip:

$$VAL(COL) = 2 \times [\text{Lower of } (HI - MID) \text{ and } (MID - LOW)]$$

where VAL(COL) is the amount of color in the color chip and HI, MID and LOW are the highest, middle and lowest valued color components from the first set of scanned values of the color chip, respectively.

9. The method of claim 4, wherein the step (e) includes the step of determining for each color in the input space PRI, SEC, VAL(PRI) and VAL(SEC) where PRI and SEC are the primary and secondary colors in the input color, respectively, and VAL(PRI) and VAL(SEC) are the values of the primary and secondary colors, respectively.

10. The method of claim 9, wherein the step (e) further includes the step of adding to each color component of the input color the percent change of the color component in the primary color multiplied by VAL(PRI) and the percent change of the color component in the secondary color multiplied by VAL(SEC) to obtain the set of second values representing the colors in the output color space.

11. The method of claim 5, wherein the step (e) includes the step of determining for each color in the input space PRI, SEC, TER, VAL(PRI), VAL(SEC) and VAL(TER), where PRI, SEC and TER are the primary, secondary and tertiary colors in the input color, respectively, and VAL(PRI), VAL(SEC) and VAL(TER) are the values of the primary, secondary and tertiary colors, respectively.

12. The method of claim 11, wherein the step (e) further includes the step of adding to each color component of the input color the percent change of the color component in the primary color multiplied by VAL(PRI) and the percent change of the color component in the secondary color multiplied by VAL(SEC) and the percent change of the color component in the tertiary color multiplied by VAL(TER) to obtain the set of second values representing the colors in the output color space.

13. A method of modifying a set of three input color component values representing a color to derive a set of four output component values for reproducing the color, comprising the steps of:

determining the lowest value of the set of three color component values;

assigning the lowest value to a black component value;

specifying a value for each of a pair of variables %REM and $K_{add}$, where %REM is the desired percentage to remove from each of the three input color component values and $K_{add}$ is the desired percentage to add to the black ink value;

decreasing each of the three input color component values by %REM multiplied by the color component value to obtain three of the four output component values; and increasing the black ink value by %REM multiplied by $K_{add}$ and the black ink value to obtain the fourth output component value.

14. A method of determining and storing a set of four ink values for reproducing a color in a color space from a set of three input color component values, comprising the steps of:

(a) determining the lowest value of the three input color component values;

(b) assigning the lowest value to a black ink value;

(c) specifying a value for each of a pair of variables %REM and $K_{add}$, where %REM is a factor which determines the amount to remove from each of the three input color component values and $K_{add}$ is a factor which determines the amount to add to the black ink value;

(d) specifying a subspace of the color space;

(e) determining whether the color to be reproduced lies within the subspace;

(f) modifying each of the three input color component values in accordance with the value of %REM only if the color to be reproduced is within the subspace to derive three of the four ink values;

(g) modifying the black ink value in accordance with the values of %REM and $K_{add}$ to derive the fourth ink value; and (h) storing the four ink values in a memory.

15. The method of claim 14, wherein the step (d) includes the step of specifying a value for a variable MINVAL and wherein the step (e) includes the step of determining whether the black ink value is less than or equal to the value of MINVAL.

16. The method of claim 15, wherein the step (d) further includes the step of specifying a value for a variable %Purity, and wherein the step (e) further includes the steps of:

calculating, when $K_n$ is greater than MINVAL, a value ST.PT. equal to:

$$(HI - K_n)(\%Purity)$$

where HI is the value of the highest valued color component of the color to be reproduced; and determining whether $K_n$ is greater than or equal to ST.PT. to ascertain whether the color to be reproduced lies within the subspace.

17. The method of claim 16, wherein a plurality of sets of ink values are stored in a memory and wherein the step (f) includes the step of addressing the memory with the three input color component values to obtain three of the four ink values when $K_n$ is less than or equal to MINVAL.

18. The method of claim 16, wherein a plurality of sets of ink values are stored in a memory and wherein the step (f) includes the step of addressing the memory with the three input color component values to obtain three of the four ink values when $K_n$ is less than ST.PT.

19. The method of claim 16, wherein the step (f) includes the step of subtracting from each of the three input color component values an amount equal to %REM multiplied by the difference between $K_n$ and ST.PT. to obtain a set of three undercolor removal values.

20. The method of claim 16, including the further step of specifying a removal percentage for each of the three input color component values, and wherein the step (f) includes the step of subtracting from each of the three input color component values an amount equal to %REM multiplied by the product of the corresponding removal percentage and the difference between $K_n$ and ST.PT. to obtain a set of three undercolor removal values.

21. The method of claim 19 or 20, wherein a plurality of sets of three ink values are stored in a memory and wherein the step (f) further includes the step of addressing the memory with the set of three undercolor removal values to obtain three of the four ink values.

22. The method of claim 16, wherein the step (g) includes the steps of:

calculating a term $\Delta K$ equal to $(K_{add})(\%REM)$ $K_n - ST.PT.$); and adding $\Delta K$ to $K_n$ to derive the fourth ink value.

* * * * *

UNITED STATES PATENT AND TRADEMARK OFFICE
CERTIFICATE OF CORRECTION

PATENT NO. : 4,481,532

DATED : November 6, 1984

INVENTOR(S) : David A. Clark and Barbara J. Boyer

It is certified that error appears in the above-identified patent and that said Letters Patent is hereby corrected as shown below:

Column 15, line 16, after "value" (second occurrence) insert --$K_n$--.

Signed and Sealed this

Eleventh Day of June 1985

[SEAL]

Attest:

DONALD J. QUIGG

Attesting Officer     Acting Commissioner of Patents and Trademarks